Figure 1:
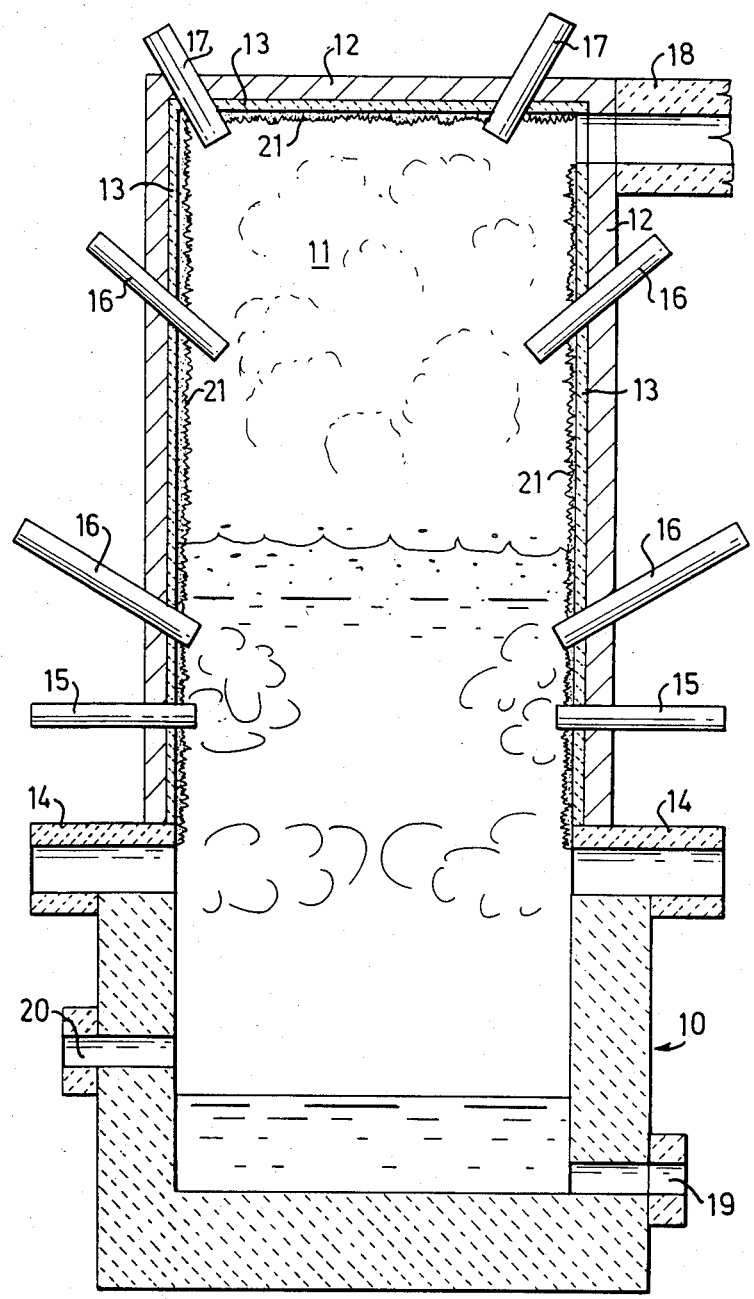

United States Patent [19]

Santén et al.

[11] Patent Number: 4,601,752

[45] Date of Patent: Jul. 22, 1986

[54] METHOD OF MANUFACTURING METALS AND/OR GENERATING SLAG

[75] Inventors: Sven Santén, Hofors, Sweden; Jerome Feinman, Grand Junction, Colo.; Sune Eriksson, Järfälla, Sweden

[73] Assignee: SKF Steel Engineering AB, Hofors, Sweden

[21] Appl. No.: 720,553

[22] Filed: Apr. 5, 1985

[30] Foreign Application Priority Data

Oct. 19, 1984 [SE] Sweden ................................ 8405230

[51] Int. Cl.$^4$ ............................................. C22C 33/00
[52] U.S. Cl. ................................... 75/10.22; 75/130.5
[58] Field of Search ....................... 75/130.5, 10 R, 11, 75/12

[56] References Cited

U.S. PATENT DOCUMENTS 3,157,492  11/1964  Matuschkovitz ................. 75/130 R
4,306,903  12/1981  Beggs ...................................... 75/11
4,396,421  8/1983  Stift ............................................. 75/11

Primary Examiner—Peter D. Rosenberg
Attorney, Agent, or Firm—Armstrong, Nikaido, Marmelstein & Kubovcik

[57] ABSTRACT

Finely powdered oxidde ore is introduced (at 17) in a reactor (11), possibly together with slag-formers, and treated in three zones in the reactor. The material is preheated and possibly melted in an upper, oxidizing zone by the combustion of carbon monoxide and hydrogen gas from the middle zone below with a gas containing oxygen. In a middle zone consisting of a slag bath, the preheated and possibly melted oxide material at least partially reduced by the simultaneous injection of carbonaceous material and/or material containing hydrocarbon (15, 16) and thermal energy supplied primarily by means of gas heated in a plasma generator (14). Finally, the material is caused to sink into a lower zone at the bottom of the reactor, from where it is tapped intermittently, together with the slag, through a tapping aperture (19).

7 Claims, 3 Drawing Figures

FLOW CHART ACC. INVENTION BASIS 1 HOUR

FLOW CHART CONVENTIONAL PLASMAPROCESS BASIS 1 HOUR

METHOD OF MANUFACTURING METALS AND/OR GENERATING SLAG

The present invention relates to a process for manufacturing metals and/or generating slag from oxide ores. Reference is made in the following description and examples to the production of ferrochrome from chromite ore. However, the invention is in no way limited to these materials but can be applied to a large number of different ferrous and non-ferrous materials.

Ferrochrome is conventionally produced from chromite ore in electric arc furnaces, using coke as reducing agent. There are drawbacks to these processes, such as the reducing agent must be high-grade metallurgical coke, it is difficult to produce metals with low carbon content and finely powdered ore generally has to be agglomerated for it to be used in processes recovering a high percentage of metal.

Improved processes based on plasma technology have been developed, in which a large part of the coke requirement is replaced by powdered carbon and in which finely powdered ore is preferred. These new processes represent a big step forward in comparison with the conventional processes using electric arc furnaces, but they still require reducing agent consisting of at least 25% metallurgical coke and the process cannot be used per se for manufacturing products with low carbon content.

The object of the present invention is to retain the advantages of the new reduction and melting processes based on plasma energy described above, while at the same time eliminating their dependence on metallurgical coke and enabling the manufacture of metal products having relatively low carbon content.

Another object of the invention is to achieve a process which is more flexible than known processes with regard to the distribution of the energy required for reduction and melting between electric energy and energy derived from burning fossil fuel.

The above and other objects are achieved by the process according to the present invention, wherein finely powdered oxide ore, possibly together with slag-formers, is treated in a reactor consisting of three zones, an upper oxidizing zone in which the material is preheated and possibly melted by the combustion of carbon monoxide and hydrogen gas from the middle zone below with a gas containing oxygen, a middle zone consisting of a slag bath in which the preheated and possibly melted oxide material is at least partially reduced by the simultaneous injection of carbonaceous material and/or material containing hydrocarbon and thermal energy supplied primarily through plasma generators and a lower zone at the bottom of the reactor into which the metal formed during the reduction process sinks and from whence it and also the slag are tapped intermittently through tapping apertures.

Figure 2:
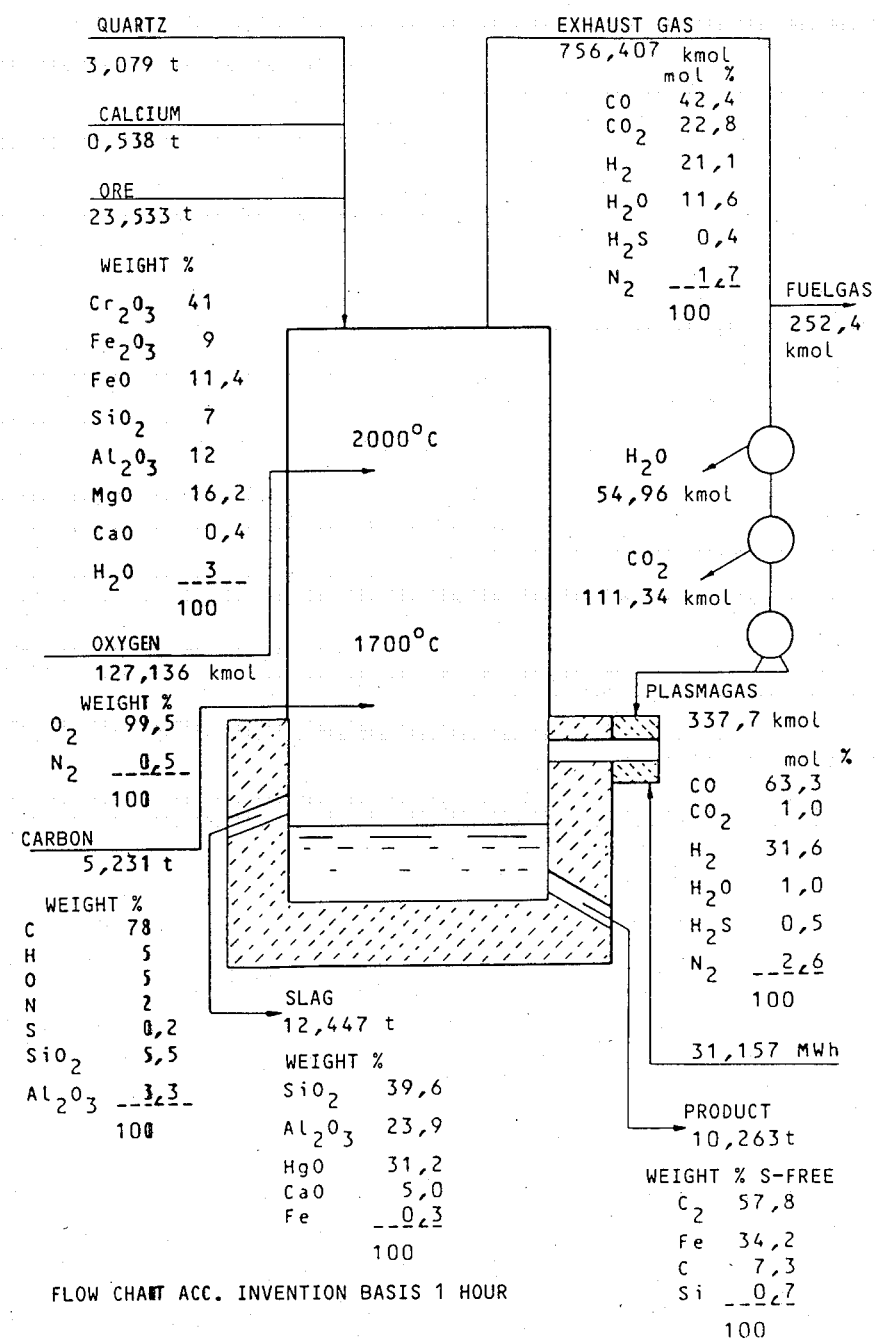
Figure 3:
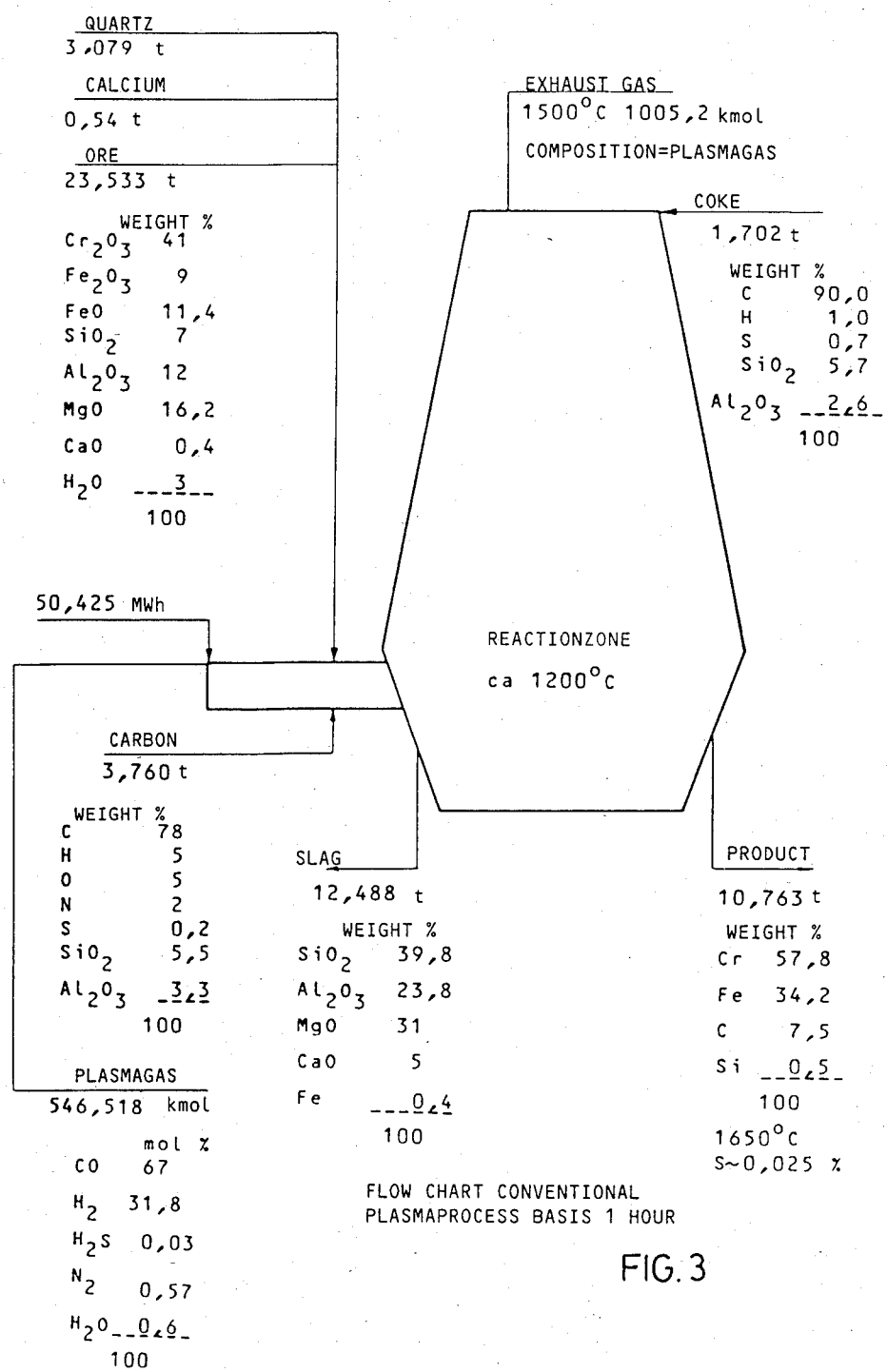

Further advantages and features of the invention will be revealed in the following detailed description with examples, and with reference to the accompanying drawings in which FIG. 1 shows a schematic view of one embodiment of a means for performing the process according to the invention, FIG. 2 shows a flow chart for the process according to the invention and FIG. 3 shows a flow chart for a conventional, plasma-based process.

FIG. 1 shows a chamber 11 constituting a high-temperature reaction zone, arranged on top of a lower, refractory-lined hearth 10. The chamber 11 is surrounded by water-cooled panels 12 consisting of metal channels through which cooling water can flow at high speed and which are provided with inner, refractory lining 13 protecting the inwardly directed metal surface from direct contact with the melt contained in the chamber 11.

The lower part of the chamber 11 is provided with plasma generators 14 supplying the process with electric energy and with carbon supply lances 15 supplying reducing agent for the process. The lances 15 are preferably arranged at a higher level in the chamber 11 than the plasma generators 14. The chamber 11 is also provided with oxygen gas lances 16 which in turn may be arranged at a higher level than the carbon lances 15. The oxygen gas is intended for combustion of a portion of the gases generated upon conversion of the carbon with the metal oxides in the system, to supply energy to heat and melt these oxides. Supply lances 17 are provided at the top of the chamber 11, possibly in the roof, for the supply of finely distributed ore and additive material to the reactor. A refractory-lined channel 18 is also arranged at the top of chamber 11, for removal of gases from the system. The hearth 10 is also provided with tapping apertures 20 and 19 for the removal of slag and metal, respectively.

The various lances for the supply of oxygen gas and reducing agents may be combined with each other and/or with the plasma generators. If oxygen gas is supplied in conjunction with the plasma generators at a low level in the chamber 11, additional oxygen gas is supplied above the surface of the slag bed.

Furthermore, a combined outlet for the slag and metal produced may be arranged at the bottom of the reactor.

The following description, referring to FIG. 1, relates to a preferred embodiment of the process according to the invention.

When the hearth 10 and chamber 11 have been heated to almost operating temperature by supplying a suitable plasma gas through the plasma generators 14, and layers of molten metal and slag have been created by melting suitable starting materials, the injection of carbon and oxygen gas is initiated through lances 15 and 16, respectively. This causes circulation of a process gas containing $CO$, $H_2$, $CO_2$ and $H_2O$, which can be at least partially recirculated as a more suitable plasma gas. Cooling, scrubbing and re-compression of the process waste gas for recirculation as plasma gas or for use as fuel are achieved by conventional means not shown in the drawings.

When operation is started in chamber 11, with accompanying circulation of the slag from the bath in the hearth 10 into the chamber 11, the supply of ore and additive through the lances 17 will be started. The reaction between carbon and oxides in the molten slag generates $CO$ and $H_2$ which will be partially combusted with oxygen gas in chamber 11. The rate of the combustion taking place in chamber 11 is controlled in order to obtain sufficient energy to preheat and melt the ore and additives added in the chamber 11.

The quantity of energy supplied through the plasma generators 14 is controlled depending on the endothermic reactions between slag and carbon. The reducing atmosphere is thus maintained in the hearth 10 and the lower part of the chamber 11 where reduction and melting take place, and a more oxidizing atmosphere is maintained in the upper and middle regions of the chamber 11, where preheating and melting take place. Slag and metal are tapped off either intermittently or continuously in conventional manner through tapping apertures 19 and 20.

The heat flux through the lining 13 in the water-cooled panels 12 is in the order of magnitude of 50 to 100 kWh/m$^2$, which causes the formation of a thin layer of frozen slag 21 on the inside of the lining 13. The temperature of the inner surface of this frozen layer of slag, which may be 1 to 2 cm thick, corresponds to the melting point of the slag and thus acts as a protection for the lining 13 and the water-cooled panels 12 from corrosive/errosive influence from the turbulent mass of solid, liquid and gaseous reactants circulating in the chamber 11.

When manufacturing ferrochrome, a temperature of approximately 2000° C. is preferred in the chamber 11 in order to pass molten reactants with a temperature of approximately 1700° C. to the lower part of the chamber 11.

Air, oxygen-enriched air, oxygen gas and/or re-circulated process gas may be used as plasma gas. If re-circulated process gas is used, water vapour and carbon dioxide are suitably removed from the gas before it enters the plasma generator.

The upper zone is preferably at least partly separated from the other zones, thus forming a flashmelting chamber. Part of the hot exhaust gas from the furnace can thus be utilized to pre-heat and melt the finely powdered oxide ore entering. This then falls down in the reactor.

The process according to the invention enables the oxygen potential in the melt zone to be controlled by controlling the rate at which the oxidizing constituents are supplied, such as metal oxides and oxidizing gases, e.g. oxygen gas, carbon monoxide, water, etc., in relation to the rate at which the reducing substances are supplied, e.g. carbon and/or material containing hydrocarbon. In this way the carbon content as well as the formation of carbide can be controlled in the metal produced. It is also possible to perform selective reduction of complex metal oxides such as reduction of Cu in the Cu-Fe-O system, Cu-Zn in the Cu-Zn-Fe-Osystem, Cu-Zn-Pb in the Cu-Zn-Pb-O system and Fe in the Fe-Ti-O system. The process according to the invention is particularly suitable in the Fe-Ti-O system for the reduction of ferric oxide and the formation of metallic iron from ilmenite, and thus the production of a slag having a high content of TiO$_2$ and low FeO content without the troublesome formation of titanium carbides or nitrocarbides.

FIG. 2 shows a flow chart for a process according to the invention and FIG. 3 shows a flow chart for a conventional, plasma-based process, both intended for the production of ferrochrome having a high carbon content. These two flow charts provide a clear picture of the advantages of the process according to the invention over the conventional process.

The advantages of the process according to the invention are further illustrated in the following table presenting a comparison between the operation parameters for the previously known plasma-based process and the process according to the invention in the manufacture of ferrochrome having high carbon content.

TABLE

|  | Conventional plasma melting | Process according to invention |
| --- | --- | --- |
| Ore supplied (ton) | 2.293 | 2.293 |
| Carbon (ton) | 0.366 | 0.510 |
| Coke (ton) | 0.166 | — |
| Oxygen gas (mol) | — | 12.388 |
| Electricity (kWh) | 4.913 | 3.036 |
| Slag (ton) | 1.217 | 1.213 |
| Fuel gas crediting (GCal) | 2.844 | 1.006 |
| Fuel gas volume (mol) | 44.69 | 24.59 |
| Total quantity exhaust gas (kmol) | 97.94 | 73.70 |
| Plasma gas (kmol) | 53.25 | 32.90 |

The process according to the invention requires no coke, as compared with 30 percent by weight for the conventional plasma melting and 40% lower direct electric energy. Furthermore, a 65% lower fuel gas crediting is necessary for the process according to the invention, which may be a considerable advantage in locations where there is no need of such fuel either externally or internally. The smaller volume of exhaust gas for the process according to the invention is another advantage since the equipment for cooling, scrubbing and re-compressing this will then be less expensive.

Certain critical characteristics and conditions for correct dimensioning and operation of the process will also be mentioned. One of the most important requirements is to maintain the function of the cooling panels forming the sides and ceiling of the reaction chamber. This is achieved by installing a lining of conducting refractory material. This will cause a thin shell of frozen slag to adhere to the lining, giving additional protection to the system. Lances 15, 16 and 17 are designed and fitted to minimize direct influence on the walls and to maximize turbulence in the reaction chamber 11. This is achieved through a combination of jet penetration, depending on size and speed, and direction. The relative placing of the plasma generators 14, carbon injection lances 15 and oxygen gas lances 16 is adjusted to ensure adequate distribution between oxidizing conditions in the upper and middle parts of the reaction chamber 11 and the reducing conditions in the hearth 10 and lower part of the chamber 11.

Isolation of the product bath from the reactions in the chamber 11 is achieved by maintaining such a depth in the slag bath in the hearth 10 on the metal bath that at least some part of the slag above the product bath remains stationary.

We claim:

1. A process for manufacturing metals and/or generating slag comprising preheating and melting oxide ore in a first upper oxidation zone of a reactor by the combustion of carbon monoxide and hydrogen with a gas containing oxygen, the carbon monoxide and hydrogen being produced in a second middle reduction zone of said reactor; and forming a slag bath in said second middle reduction zone of said reactor and at least partially reducing the preheated and melted ore in said slag bath by the simultaneous injection therein of (i) a reducing agent selected from a carbonaceous material, a hydrocarbon-containing material and mixtures thereof and (ii) gas heated in a plasma generator to form a metal and a gas containing carbon monoxide and hydrogen; and removing said metal and slag from a third lower zone of said reactor.

2. A process according to claim 1 wherein said ore is introduced with a slag-former into said first upper zone.

3. A process according to claim 1, wherein at least the parts of the reactor surrounding the oxidation and reduction zones are cooled by means of water-cooled panels lined with inwardly directed refractory material, with the aid of which a layer of frozen slag is formed on the inner walls of the reactor.

4. A process according to claim 1, wherein the carbonaceous material and/or material containing hydrocarbon is introduced at a level above that at which the gas heated by plasma generator is supplied.

5. A process according to claim 1, wherein carbonaceous material and/or material containing hydrocarbon, and a gas containing oxygen, are introduced into said middle reduction zone of the reactor and a gas containing oxygen is also supplied to said upper oxidation zone of the reactor.

6. A process according to claim 1, wherein the upper oxidation zone of the reactor is at least partly separated from the other zones and the preheated material falls down into the middle reduction zone from the upper oxidation zone.

7. A process according to claim 6, wherein hot exhaust gas is withdrawn from the top of the reactor and at least a part thereof is used for the preheating and melting in the at least partly separated upper zone, thus forming a flashmelting zone.

* * * * *